United States Patent [19]

Clark et al.

[11] 4,024,047

[45] May 17, 1977

[54] ELECTROSTATIC WATER TREATMENT APPARATUS

[75] Inventors: David C. Clark; Louis H. Silverman; John K. Barnard, all of Erie, Pa.

[73] Assignee: Progressive Equipment Corporation, Erie, Pa.

[22] Filed: Jan. 20, 1976

[21] Appl. No.: 650,673

[52] U.S. Cl. ............................................. 204/302
[51] Int. Cl.² ........................................ B03C 5/02
[58] Field of Search ........................ 204/302–308, 204/149, 186

[56] References Cited

UNITED STATES PATENTS 3,202,601  8/1965  Green ................................ 204/302
3,701,723  10/1972  Cole et al. ......................... 204/188

Primary Examiner—John H. Mack
Assistant Examiner—Aaron Weisstuch
Attorney, Agent, or Firm—Ralph Hammar

[57] ABSTRACT

Electrostatic water treating apparatus having a hollow charging electrode with an external impervious dielectric coating immersed in the water to be treated in which the interior of the electrode is kept dry by a water tight cap telescoped over the dielectric coating and having an O-ring seal with its wet side engaging the water and its dry side vented to the atmosphere.

11 Claims, 8 Drawing Figures

ELECTROSTATIC WATER TREATMENT APPARATUS

This invention is intended to simplify the construction and increase the reliability of operation of electrostatic water treating apparatus by an improved structure for supporing the charging electrode and for preventing injury to the dielectric coating during assembly or disassembly for inspection and repair. In one form a water pipe may serve the function of the shell through which the water to be treated is conducted into contact with the charging electrode.

In the drawings

Figure 2:
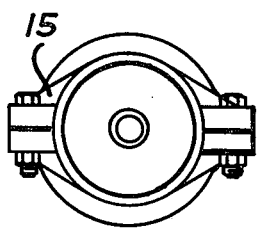
FIG. 2 is a top plan view.

In a preferred form of apparatus for the electrostatic water treatment a hollow electrode 1 having an insulating coating 2 on its outer surface is positively charged by a high positive voltage (e.g. 1,000 to 12,000 volts). The electrode is at the center of an externally grounded metal shell 3, and the water to be treated enters through a fitting 4 and leaves through a fitting 4a. While the annular stream of water flows past the electrode the positive charge on the electrode attracts free electrons from the water and minerals and causes electron collisions with mineral and biological material in the water. As a result, the mineral and biological materials settle out and may be periodically flushed down a drain.

Figure 3:
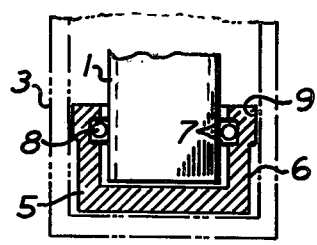
FIG. 3 is an enlarged section through the end cap sealing the lower end of the charging electrode.
Figure 4:
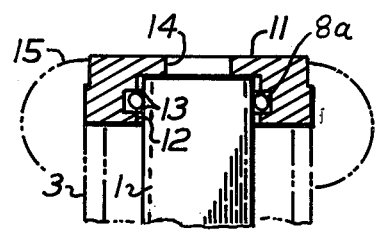
FIG. 4 is an enlarged section through the top end cap and the seal between the cap and the upper end of the charging electrode.

The lower end of the tubular electrode 1 is closed by a water tight end cap 5 shown in larger scale in FIG. 3, having cylindrical side walls 6 telescoped over the lower end of the tube. On the interior of the cylindrical side walls is an annular groove 7 for an O-ring 8 or other self energizing seal which excludes water from the interior of the electrode and keeps it dry. At the upper end of the cap are projections 9 which bear on the inner surface of the shell 3 and positively center the electrode within the shell. When the apparatus has a larger diameter, and a greater clearance is provided between the electrode and the shell, projections 9 may be extended or other spacing means added so the electrode is maintained in a central position. This is important to avoid damage to the dielectric coating 2 by scratching or scraping against metal surfaces during insertion or removal of the electrode for inspection and replacement or repair.

Figure 1:
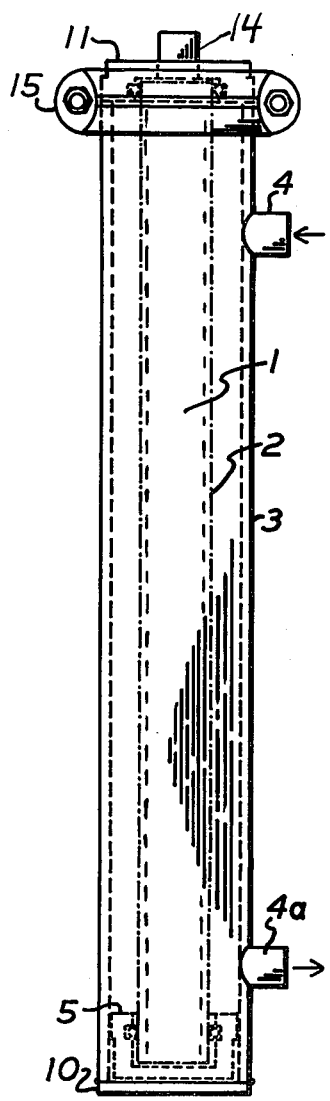
FIG. 1 is an elevation of a preferred form of water treatment unit.
Figure 6:
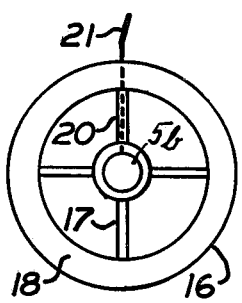
FIG. 6 is a plan view of the spider supporting the end of the electrode shown in FIG. 5.
Figure 5:
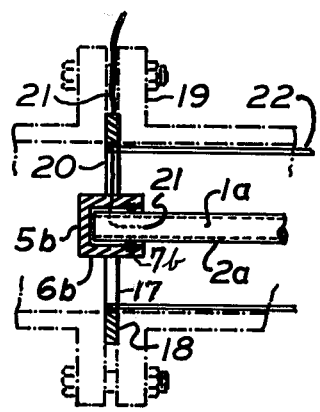
FIG. 5 is a section through a pipe and one end of a charging electrode.
Figure 8:
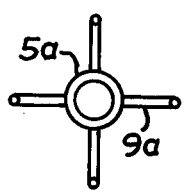
FIG. 8 is a plan view of the spider for centering the end of the electrode shown in FIG. 7.
Figure 7:
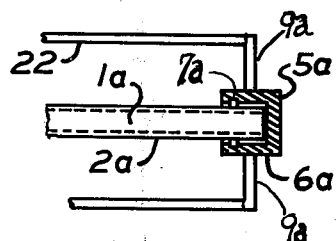
FIG. 7 is a section through the other end of the FIG. 5 electrode.

Since the interior of the electrode is dry and vented to the atmosphere, the water pressure acting on the end cap would blow the end cap off the lower end of the electrode unless some restraint were provided. In the structure of FIG. 1, this restraint is provided by a cover 10, permanently welded to the lower end of the shell 3 on which the end cap 5 rests.

At the upper end of the electrode is a liquid tight cap 11 having cylindrical side walls 12 telescoped over the upper end of the electrode. The side walls 12 have an internal groove 13 for an O-ring 8A or other style of pressure energizing seal which positively seals water from the interior of the electrode. At the center of the cap is opening 14 which vents the interior of the electrode to atmosphere and also provides an opening for electrically connecting the charging voltage to the electrode. The upper or dry side of O-ring 8A is also vented through opening 14. The top cap 11 is secured to the upper end of the shell 3 by a standard coupling 15 which is available at ASME certified pressure ratings required by the pressure of the water being treated. The end thrust from water pressure on the top cap 11 is transferred to the coupling 15 and from the coupling to the shell 3.

The structure eliminates the need for special closures and easily meets pressure vessel code requirements. The bottom end cap 5 can be assembled on the electrode outside the shell where the assembly can be watched and checked. Insertion of the electrode and end cap assembly into the shell does not result in scratching of the dielectric coating due to the centering effect of the end cap.

In FIGS. 5 through 8 is shown water treatment apparatus which can be inserted in existing piping which functions as a shell for conducting the water to be treated over the charging electrode. This structure uses a hollow electrode 1a with the dielectric coating 2a. One end FIG. 7 of the electrode is closed by a liquid tight cap 5a having cylindrical walls 6a telescoped over the electrode and having an internal groove 7a for an O-ring providing a water tight seal to the outer surface of the electrode. Spacing rods 9a center the electrode within the pipe so as to maintain a uniform electrostatic field between the electrode and the pipe. At the other end of the pipe (FIGS. 5 and 6) is a liquid tight cap 5b having side walls 6b telescoped over the outer surface of the pipe and provided with an internal groove 7b for an O-ring which provides a positive water tight seal to the outer surface of the electrode. The cap 5b is centered by a spider 16 having spokes 17 fixed at the inner end to the cap 5b and at the outer end to a sealing ring 18 clamped between the pipe flanges 19. In one of the spokes of the spider is a hollow metal tube 20 opened at its inner end to the dry side of the cap 5b and at its outer end to the atmosphere. The tube 20 also vents the dry side of O-ring in groove 7 to the atmosphere. This hollow tube 20 provides a conduit for a wire 21 connecting a high positive voltage D.C. to the electrode.

End thrust due to water pressure on the caps 5a and 5b is taken by wires or rods 22 connected between the outer ends of the spacing members 9a and 17. These rods or cables are close to the inner surface of the pipe and have minimal effect upon the electrostatic field acting on the water.

What is claimed is:

1. An electrostatic water treatment apparatus comprising a hollow electrode adapted to be immersed in the water to be treated, an impervious dielectric coating on the exterior of the electrode insulating the electrode from the water, an end cap having at least a portion of its exterior surfaces adapted to be immersed in the water to be treated for preventing leakage of water into one end of said electrode, said end cap having walls telescoped over the dielectric coating on said end of the electrode, an O-ring groove in said walls, an O-ring in said groove having one side subject to water pressure for compressing the O-ring against the groove and the dielectric coating for preventing leakage of water into the interior of the electrode, a passageway leading to the atmosphere through the end cap and the hollow electrode from the dry side of the O-ring, and means for holding the cap on said electrode.

2. The apparatus of claim 1 in which leakage into both ends of the electrode is prevented by an end cap and O-ring seal as defined in claim 1.

3. The apparatus of claim 2 in which the means for taking end thrust comprises tension means tying the end caps together.

4. The apparatus of claim 2 in which the passageway to the atmosphere comprises a tube leading to one of the end caps.

5. The apparatus of claim 1 in which the water to be treated is adapted to flow through a shell in an annular stream over the electrode and the end cap has centering means bearing on the shell.

6. The apparatus of claim 5 in which the shell is a water line, and the electrode centering means has passageways through which the water flows.

7. The apparatus of claim 6 in which the centering means is a spider.

8. The apparatus of claim 5 in which the shell is a water line having a coupling between adjacent sections of pipe and one end cap is anchored to the coupling.

9. The apparatus of claim 8 in which the coupling is a flange coupling, and one end cap is at the center of a spider sandwiched between the flanges.

10. The apparatus of claim 5 in which the means for holding the end cap on said electrode comprises a cover fixed to the shell and in thrust relation to the end cap.

11. An electrostatic water treatment apparatus comprising a cylindrical shell adapted to hold water under pressure and having a coupling at one end, an electrode extending into the shell from said coupling and forming with said shell an annular passageway through which the water is adapted to flow, an impervious dielectric coating on the exterior of the electrode adapted to insulate the electrode from the water, means for centering one end of the electrode in the coupling, means on the other end of the electrode slidably engaging the shell for centering the other end of the electrode in the shell, an end cap on said other end of the electrode having a closed end wall spaced from the shell and extending over said other end of the electrode and having its exterior surface in free communication with said annular passageway, said end cap having side walls sealed against said dielectric coating, the exterior surfaces of said end and side walls being immersed in the water to be treaded, and means for venting the interior of said end cap to the atmosphere.

* * * * *